United States Patent
Chapin et al.

(10) Patent No.: US 9,870,572 B2
(45) Date of Patent: Jan. 16, 2018

(54) SYSTEM AND METHOD OF PROVIDING INFORMATION BASED ON STREET ADDRESS

(75) Inventors: Charles Chapin, San Jose, CA (US); Xinyu Tang, Cupertino, CA (US); Vibhor Nanavati, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 1009 days.

(21) Appl. No.: 13/112,513

(22) Filed: May 20, 2011

(65) Prior Publication Data

US 2016/0104195 A1    Apr. 14, 2016

Related U.S. Application Data

(63) Continuation-in-part of application No. 12/493,532, filed on Jun. 29, 2009.

(51) Int. Cl.
*G06Q 30/00* (2012.01)
*G06Q 30/02* (2012.01)
*G06F 17/30* (2006.01)

(52) U.S. Cl.
CPC ... *G06Q 30/0256* (2013.01); *G06F 17/30864* (2013.01); *G06Q 30/0259* (2013.01); *G06Q 30/0277* (2013.01)

(58) Field of Classification Search
CPC .............................. G06Q 30/02; G06Q 30/00
USPC .............................................. 705/14.1, 14.4
See application file for complete search history.

(56) References Cited

U.S. PATENT DOCUMENTS

| | | | |
|---|---|---|---|
| 6,202,023 B1 * | 3/2001 | Hancock | G01C 21/20 701/516 |
| 6,478,495 B2 | 11/2002 | Ami et al. | |
| 6,487,495 B1 * | 11/2002 | Gale et al. | 701/461 |
| 6,502,091 B1 | 12/2002 | Chundi et al. | |
| 6,704,729 B1 * | 3/2004 | Klein | G06F 17/30696 |
| 7,027,987 B1 | 4/2006 | Franz et al. | |
| 7,366,668 B1 | 4/2008 | Franz et al. | |
| 7,536,408 B2 | 5/2009 | Patterson | |
| 8,346,751 B1 | 1/2013 | Jin et al. | |
| 2002/0035607 A1 | 3/2002 | Checkoway et al. | |
| 2002/0059207 A1 * | 5/2002 | Shimazu | 707/3 |
| 2003/0126235 A1 | 7/2003 | Chandrasekar et al. | |
| 2003/0177111 A1 | 9/2003 | Egendorf et al. | |
| 2004/0019588 A1 | 1/2004 | Doganata et al. | |

(Continued)

OTHER PUBLICATIONS

International Search Report dated Dec. 26, 2012 for PCT Application US2012/047555.

(Continued)

*Primary Examiner* — Arthur Duran
(74) *Attorney, Agent, or Firm* — Dority & Manning, P.A.

(57) ABSTRACT

A system and method is provided that infers a user's intent when the user searches for a particular address or other geographic location. In that regard, the system and method may select advertisements in response to a user searching for street addresses. The advertisements may be selected by searching for advertisements that match search terms associated with the street address. If no search terms are associated with the street address, the system and method may determine whether the street address is associated with a point of interest. If the address is associated with a point of interest, the name of the point of interest may be utilized as the search term.

14 Claims, 15 Drawing Sheets

(56) References Cited

U.S. PATENT DOCUMENTS

| | | | |
|---|---|---|---|
| 2004/0261021 A1 | 12/2004 | Mittal et al. | |
| 2005/0086612 A1 | 4/2005 | Gettman et al. | |
| 2005/0278317 A1 | 12/2005 | Gross et al. | |
| 2006/0074751 A1* | 4/2006 | Kline | G06Q 30/02 705/14.55 |
| 2006/0184538 A1* | 8/2006 | Randall et al. | 707/10 |
| 2006/0238382 A1 | 10/2006 | Kimchi et al. | |
| 2006/0271280 A1* | 11/2006 | O'Clair | 701/208 |
| 2006/0271531 A1* | 11/2006 | O'Clair | G06F 17/3087 |
| 2007/0016556 A1* | 1/2007 | Ann et al. | 707/3 |
| 2007/0073667 A1 | 3/2007 | Chung | |
| 2007/0088692 A1* | 4/2007 | Dean | G06F 17/30864 |
| 2007/0198504 A1 | 8/2007 | Feng et al. | |
| 2007/0203906 A1 | 8/2007 | Cone et al. | |
| 2007/0203940 A1 | 8/2007 | Wang et al. | |
| 2007/0214154 A1* | 9/2007 | Ducatel | G06F 17/30864 |
| 2007/0233375 A1* | 10/2007 | Garg et al. | 701/211 |
| 2007/0239534 A1* | 10/2007 | Liu et al. | 705/14 |
| 2007/0239716 A1* | 10/2007 | Weininger et al. | 707/6 |
| 2007/0273558 A1* | 11/2007 | Smith | G08G 1/0962 340/995.1 |
| 2007/0273758 A1 | 11/2007 | Mendoza et al. | |
| 2007/0288454 A1 | 12/2007 | Bolivar et al. | |
| 2008/0033971 A1 | 2/2008 | Carmel et al. | |
| 2008/0082400 A1 | 4/2008 | Martel et al. | |
| 2008/0086356 A1 | 4/2008 | Glassman et al. | |
| 2008/0144936 A1* | 6/2008 | Nishikawa | 382/177 |
| 2008/0148175 A1* | 6/2008 | Naaman | G06F 17/3087 715/781 |
| 2008/0168032 A1 | 7/2008 | Criou et al. | |
| 2008/0248815 A1* | 10/2008 | Busch | H04W 4/02 455/456.5 |
| 2008/0249701 A1* | 10/2008 | Zhuang | 701/200 |
| 2008/0270364 A1* | 10/2008 | Bayardo | G06F 17/30864 |
| 2008/0270379 A1 | 10/2008 | Ramakrishna | |
| 2009/0019028 A1 | 1/2009 | Norris et al. | |
| 2009/0055273 A1* | 2/2009 | Miyazawa | 705/14 |
| 2009/0070309 A1* | 3/2009 | Gajda et al. | 707/4 |
| 2009/0070312 A1 | 3/2009 | Patterson | |
| 2009/0138445 A1* | 5/2009 | White | G06Q 30/02 |
| 2009/0157523 A1 | 6/2009 | Jones et al. | |
| 2009/0182729 A1 | 7/2009 | Lu et al. | |
| 2009/0210409 A1* | 8/2009 | Levin | G06F 17/30864 |
| 2009/0241061 A1* | 9/2009 | Asai et al. | 715/808 |
| 2009/0271228 A1 | 10/2009 | Bilenko et al. | |
| 2009/0271400 A1* | 10/2009 | Uchida et al. | 707/5 |
| 2009/0282022 A1 | 11/2009 | Bennett | |
| 2009/0306961 A1* | 12/2009 | Li et al. | 704/9 |
| 2009/0327078 A1* | 12/2009 | Ohazama et al. | 705/14.54 |
| 2010/0027527 A1 | 2/2010 | Higgins et al. | |
| 2010/0125492 A1* | 5/2010 | Lin | G06O 20/3274 705/14.5 |
| 2010/0198684 A1* | 8/2010 | Eraker et al. | 705/14.49 |
| 2010/0293173 A1 | 11/2010 | Chapin et al. | |
| 2010/0310182 A1 | 12/2010 | Kroepfl et al. | |
| 2011/0131243 A1* | 6/2011 | Aben et al. | 707/771 |
| 2014/0214817 A1 | 7/2014 | Hu et al. | |

OTHER PUBLICATIONS

Written Opinion dated Dec. 26, 2012 for PCT/US2012/047555.

"Multiple Listing Service" [online]. [Retrieved May 25, 2009]. Retrieved from the internet. <http://en.wikipedia.org/wiki/Multiple_Listing_Service>, 5 pages.

* cited by examiner

710

| Instances where listing was selected from search results | | |
|---|---|---|
| CID | Date | Query |
| {Joe's Pizza} | 1/1/09 10:00 am | Calzones Springfield USA |
| {Joe's Pizza} | 1/1/09 11:05 am | Pizza |
| {Joe's Pizza} | 1/1/09 12:40 pm | Calzones Pizza |
| {Joe's Pizza} | 1/1/09 2:08 pm | Springfield Pizza |
| {Joe's Pizza} | 1/1/09 4:30 pm | Calzones |
| {Joe's Pizza} | 1/1/09 7:10 pm | Calzones |
| {Joe's Pizza} | 1/1/09 9:10 pm | Menu |
| ... | ... | ... |

712     714     716

720

| Most popular query for listing | | |
|---|---|---|
| CID | Search Term | Clicks |
| {Joe's Pizza} | Calzones | 210 |
| {Joe's Pizza} | Pizza | 190 |
| {Joe's Pizza} | Menu | 80 |
| ... | ... | ... |

Candidate terms per listing

| CID | Search Term | Source |
|---|---|---|
| {Joe's Pizza} | Joe | Title |
| {Joe's Pizza} | Pizza | Title |
| {Joe's Pizza} | Pizza | Category |
| {Joe's Pizza} | Calzones | Query (210) |

Best candidate search term at location, by listing

| FID | CID | Search Term | Source |
|---|---|---|---|
| {25 Second Street, Springfield} | {Emily's Hair Care} | Haircut | Query (100) |
| {25 Second Street, Springfield} | {Joe's Pizza} | Calzones | Query (210) |
| {25 Second Street, Springfield} | {2nd Destinations} | Destinations | Title |

Search term, by location

| | |
|---|---|
| {25 Second Street, Springfield} | Calzones |
| {26 Second Street, Springfield} | Discount Store |
| {27 Second Street, Springfield} | Beauty |
| ... | ... |

FIGURE 10

SYSTEM AND METHOD OF PROVIDING INFORMATION BASED ON STREET ADDRESS

CROSS REFERENCE TO RELATED APPLICATIONS

This application is a continuation-in-part of application Ser. No. 12/493,532 filed on Jun. 29, 2009, the entire disclosure of which is incorporated by reference herein.

BACKGROUND

There are a variety of services related to searching. For example, a user may enter a search term on a web page offered by a service, and the service returns a webpage containing matching results. A variety of techniques may be used to rank the results. For example, if the results are websites, the websites may be ranked based on their popularity. The results may also be selected and ranked based on the prior search history, e.g., a result is more likely to be ranked higher if many prior users selected the same result in response to a similar query.

A user may also enter a street address or latitude/longitude position as a search request. In response, the user will receive a webpage containing the results of the search. The results may include a map of the requested location and all of the businesses known by the system to be located at the address.

In addition to searching for locations, a user may also enter other search terms. For example, a user may search for "pizza" while viewing a map. In response, the service may provide listings that are proximate to the map and fall within the category of pizza restaurants or otherwise match the request such as having the term "pizza" in their company name. Other results may be provided as well, such as web pages and other information. The service may also display responsive advertisements to the user that are limited to particular geographic areas (e.g., particular cities or ranges of latitude/longitude coordinates).

In certain circumstances, the service also stores an association between the search terms entered by a user and the portion of the map being viewed by a first user. Those terms may be used, either alone or in combination with other prior user searches and criteria, to query and display advertisements when subsequent users view a portion of the map that overlaps with the prior portion.

One system, Google Maps, is also capable of displaying street level images of geographic locations. These images, identified in Google Maps as "Street Views", typically comprise photographs of buildings and other geographic features and allow a user to view a geographic location from a person's perspective as compared to a top-down map perspective. When a street level image is taken, it is typically associated with a location such as the latitude/longitude position of the camera. The street level image may also comprise a 360° panorama, such that the user may view the panorama—and the objects captured therein—from a variety of angles. The service also displays a street address to the user that is intended to approximate the closest street address to the location of the camera when the image was taken.

BRIEF SUMMARY

In accordance with one embodiment of the invention, a method comprises receiving a request from a remote computer, the request identifying the geographic location; determining whether a search term associated with the geographic location can be generated based on at least one metric; if the search term associated with the geographic location cannot be generated based on the at least one metric, determining if the geographic location is associated with a point of interest; if it is determined that the geographic location is associated with the point of interest, the processor setting the search term to a title of the point of interest; determining information based on the search term; and, transmitting the information to the remote computer in response to the request.

In one alternative, the at least one metric relates to a number of previous users selecting a listing associated with the geographic location in response to the search term, the number of previous users exceeding a predetermined threshold. The listing may be a business located at the geographic location. The at least one metric may relate to a number of listing categories associated with the geographic location such that the search term can be generated if the number of listing categories falls below a given threshold.

In another alternative, a unique identifier associates the point of interest with the geographic location. In a further alternative, the selected information is at least one business listing associated with the point of interest. In another example, the selected information is at least one advertisement associated with the point of interest.

In accordance with another embodiment of the invention, a system comprises a processor having access to a set of instructions operable by the processor; memory for storing street addresses; memory for storing listing information for businesses, where each business is associated with a member of the street addresses; memory for storing a set of advertisements, where each advertisement is associated with a keyword; and, memory for storing a set of point of interest data associated with the member of the street addresses and the listing information. The processor may be coupled to the memory for storing listing information, the memory for storing the set of advertisements, the memory for storing street addresses, and the memory for storing the set of point of interest data. The processor may be configured to receive a request from a remote computer, the request identifying geographic location information; to determine whether a search term associated with the geographic location information can be generated based on at least one metric; to determine if the geographic location is associated with a point of interest, when the search term associated with the geographic location information cannot be generated based on the at least one metric; to set the search term to a title of the point of interest, if it is determined that the geographic location information is associated with the point of interest; to determine information based on the search term; and, to transmit the selected information to the remote computer in response to the request.

In one example, the at least one metric relates to a number of previous users selecting a listing from the listing information associated with the geographic location in response to the search term, the number exceeding a predetermined threshold.

In another example, the at least one metric relates to a number of listing categories associated with the geographic location such that the search term can be generated if the number of listing categories falls below a given threshold. The information may be at least one advertisement from the set of advertisements and at least one listing from the listing information for businesses. The at least one advertisement and the at least one listing may pertain to the point of interest.

In accordance with a further embodiment of the invention, a method of selecting information associated with a geographic location comprises receiving a request identifying the geographic location; determining if the geographic location is associated with a point of interest; if the geographic location is associated with the point of interest, setting a first search term equal to a title of the point of interest; generating a second search term associated with the geographic location based on at least one metric; determining a first weight associated with the first search term, the first weight being proportional to a probability that the first search term will result in information that coincides with an intention of a user sending the request; determining a second weight associated with the second search term, the second weight being proportional to a second probability that the second search term will result in information that coincides with the intention of the user sending the request; if the first weight is greater than or equal to the second weight, the processor determining information based on the first search term; if the second weight is greater than the first weight, determining information based on the second search term; and transmitting the information to a remote computer in response to the request.

In one example, the at least one metric relates to a number of previous users selecting listing information associated with the geographic location in response to the search term, the number exceeding a predetermined threshold.

BRIEF DESCRIPTION OF THE DRAWINGS

FIG. 7 illustrates sample data associated with a listing in accordance with an aspect of the invention.

FIG. 8 is a diagram of sample data associated with a listing in accordance with an aspect of the invention.

FIG. 9 is a diagram of sample data associated with a plurality of listings at a street address in accordance with an aspect of the invention.

FIG. 10 is a diagram of sample data associated with a plurality of street addresses in accordance with an aspect of the invention.

DETAILED DESCRIPTION

In one aspect, the system and method infers a user's intent when the user searches for a particular address or other geographic location. In that regard, the system and method may select advertisements in response to a user searching for street addresses.

The advertisements may be selected by searching for advertisements that match search terms associated with the street address. The search terms may become associated with the address by analyzing the businesses located at the street address. The search terms may comprise the titles and categories of the businesses. The search terms may also comprise the most-popular search terms for finding the businesses at the address. Yet further, a single search term may be selected for the entire street address such that the search term is determined to be the most effective search term for the most popular business at the address.

Figure 1:
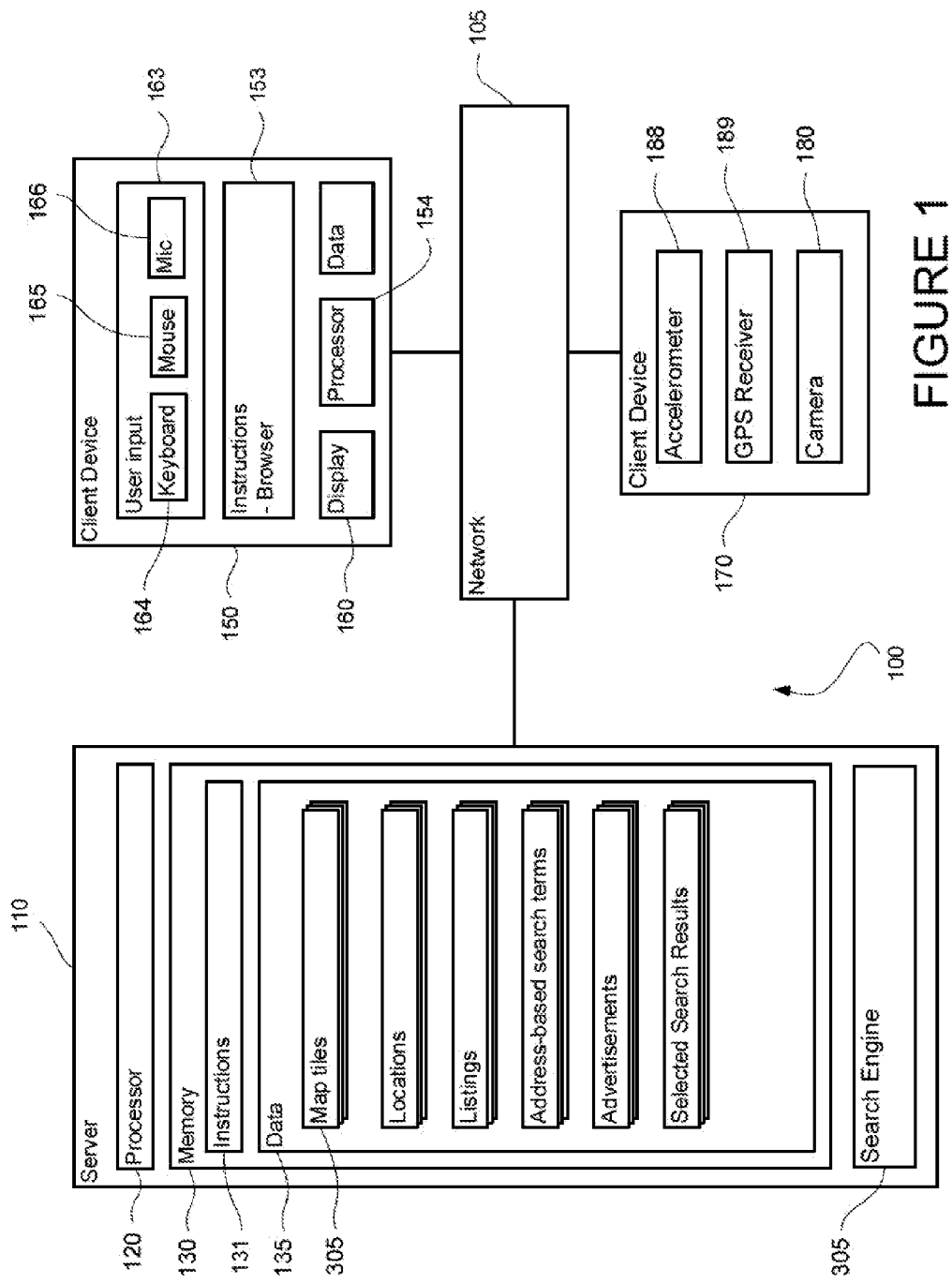
FIG. 1 is a functional diagram of a system in accordance with an aspect of the invention.
Figure 2:
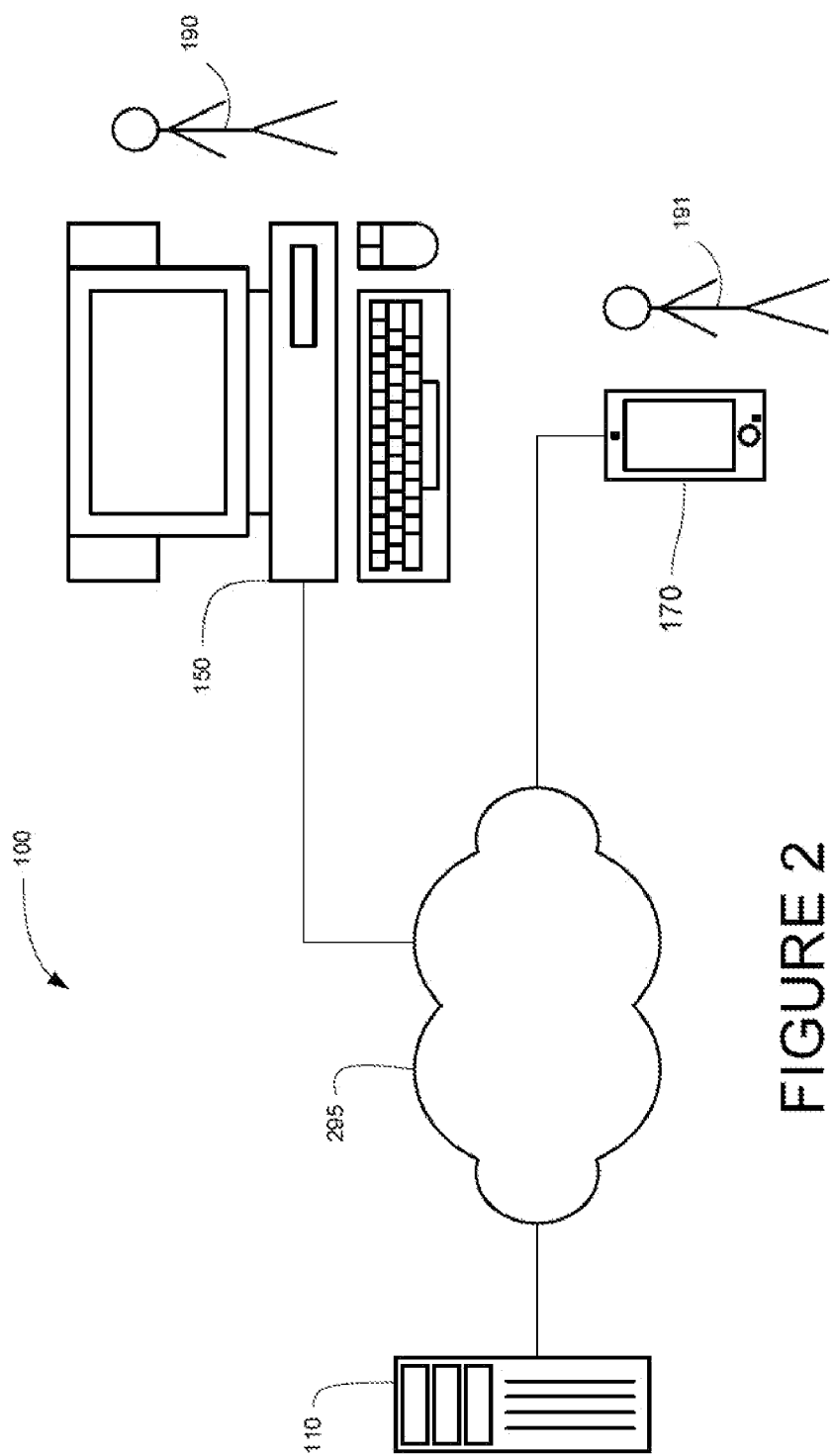
FIG. 2 is a pictorial diagram of the system of FIG. 1.

As shown in FIGS. 1-2, a system 100 in accordance with one aspect of the invention includes a computer 110 containing a processor 120, memory 130 and other components typically present in general purpose computers.

Memory 130 stores information accessible by processor 120, including instructions 131 that may be executed by the processor 120. It also includes data 135 that may be retrieved, manipulated or stored by the processor. The memory may be of any type capable of storing information accessible by the processor, including a computer-readable medium such as a hard-drive, memory card, ROM, RAM, DVD or other optical disks, as well as other write-capable and read-only memories. The processor 120 may be any well-known processor, such as processors from Intel Corporation or AMD. Alternatively, the processor may be a dedicated controller such as an ASIC.

The instructions 131 may be any set of instructions to be executed directly (such as machine code) or indirectly (such as scripts) by the processor. For example, the instructions may be stored as computer code on the computer-readable medium. In that regard, the terms "instructions" and "programs" may be used interchangeably herein. The instructions may be stored in object code format for direct processing by the processor, or in any other computer language including scripts or collections of independent source code modules that are interpreted on demand or compiled in advance. Functions, methods and routines of the instructions are explained in more detail below.

Data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format such as, but not limited to, binary values, ASCII or Unicode. By further way of example only, image data may be stored as bitmaps comprised of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Although FIG. 1 functionally illustrates the processor and memory as being within the same block, it will be understood by those of ordinary skill in the art that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor. Accordingly, references to a processor or computer will be understood to include references to a collection of processors or computers that may or may not operate in parallel.

The computer 110 may be at one node of a network 105 and capable of directly and indirectly communicating with other nodes of the network. For example, computer 110 may comprise a web server that is capable of communicating with client devices 150 and 170 via network 105. Yet further, server 110 may use network 105 to transmit and display information to user 190 on monitor 160 of client device 150. Server 110 may also comprise a plurality of computers that exchange information from different nodes of a network for the purpose of receiving, processing and transmitting data to the client devices; is this instance, the client devices may be at different nodes of the network than any of the computers comprising server 110.

Network 105, and intervening nodes between server 110 and client devices, may comprise various configurations and use various protocols including the Internet, World Wide Web, intranets, virtual private networks, wide area networks, local networks, private networks using communication protocols proprietary to one or more companies, cellular and wireless networks, Internet relay chat channels (IRC), instant messaging, simple mail transfer protocols (SMTP), Ethernet, WiFi and HTTP, and various combinations of the foregoing. Although only a few computers are depicted in FIGS. 1-2, it should be appreciated that a typical system can include a large number of connected computers.

Each client device may be configured similarly to the server 110, with a processor, memory and instructions. Each client device 150 and 170 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by a processor), DVD drive, hard-drive, user input 163 (for example, a mouse 165, keyboard 164, touch-screen or microphone 166), speakers, modem or network interface device (telephone, cable, wireless or otherwise), and all of the components used for connecting these elements to one another.

Although the client devices 150 and 170 may comprise a full-sized personal computer, the system and method may also be used in connection with mobile devices capable of wirelessly exchanging data with a server over a network such as the Internet. For example, a client device 170 may be a wireless-enabled PDA such as a Blackberry phone or an Internet-capable cellular phone. The user may input information using a small keyboard (in the case of a Blackberry phone), a keypad (in the case of a typical cell phone), a touch screen (in the case of a PDA) or any other user input device. Indeed, computers in accordance with the systems and methods described herein may comprise any device capable of processing instructions and transmitting data to and from humans and other computers including general purpose computers, network computers lacking local storage capability, and set-top boxes for televisions.

The client devices may also include a component, such as circuits, to determine the geographic location and orientation of the device. For example, client device 170 may include a GPS receiver 189 to determine the device's latitude, longitude and altitude position. The component may also comprise software for determining the position of the device based on other signals received at the client device 170, such as signals received at a cell phone's antenna from one or more cell phone towers if the client device is a cell phone. It may also include an accelerometer 188 or gyroscope to determine the direction in which the device is oriented. By way of example only, the device may determine its pitch, yaw or roll (or changes thereto) relative to the direction of gravity or a plane perpendicular thereto. In that regard, it will be understood that a client device's provision of location and orientation data as set forth herein may be provided automatically to the user, the server, or both.

Although certain advantages are obtained when information is transmitted or received as noted above, other aspects of the system and method are not limited to any particular manner of transmission of information. For example, in some aspects, information may be sent via a medium such as a disk, tape or CD-ROM. In other aspects, the information may be transmitted in a non-electronic format and manually entered into the system. Yet further, although some functions are indicated as taking place on a server and others on a client, various aspects of the system and method may be implemented by a single computer having a single processor.

Figure 3:
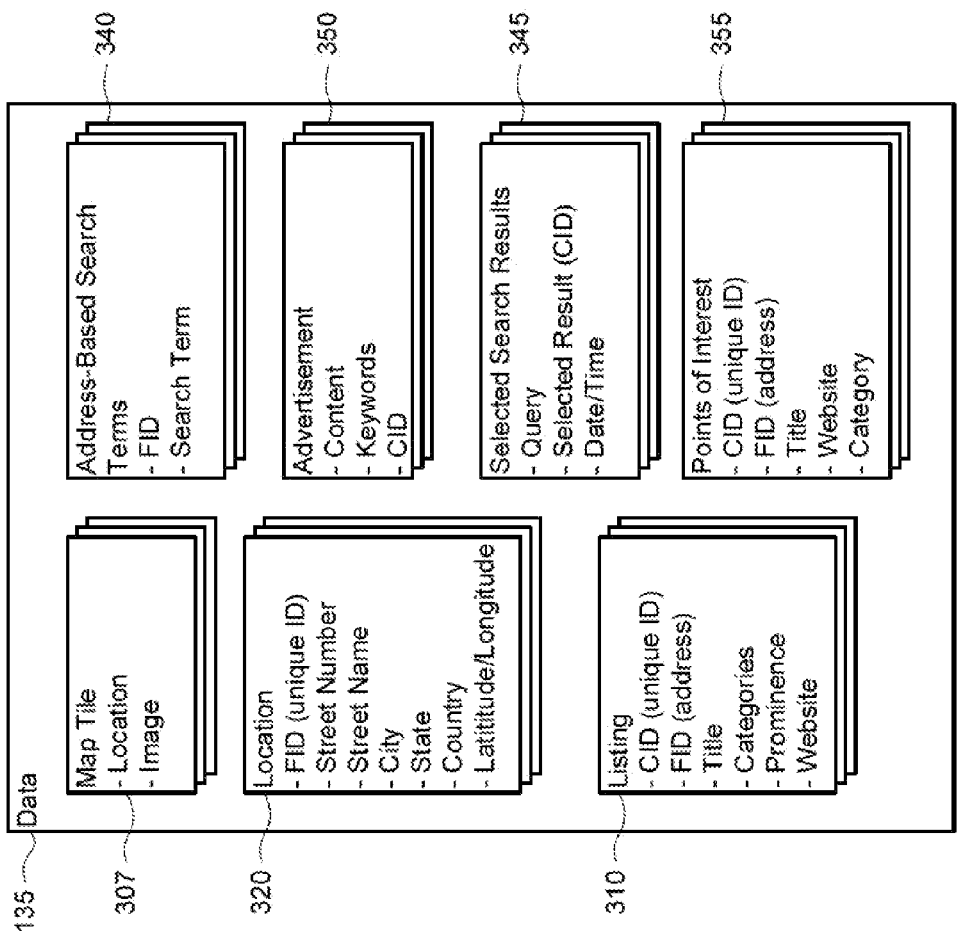
FIG. 3 is a functional diagram of data in accordance with an aspect of the invention.

Server 110 may store map-related information, at least a portion of which may be transmitted to a client device. For example and as shown in FIG. 3, the server may store map tiles 307, where each tile is a map image of a particular geographic area. Depending on the resolution (e.g., whether the map is zoomed in or out), one tile may cover an entire region such as a state in relatively little detail. Another tile may cover just a few streets in high detail. The map information is not limited to any particular format. For example, the images may comprise street maps, satellite images, or a combination of these, and may be stored as vectors (particularly with respect to street maps) or bitmaps (particularly with respect to satellite images).

The various map tiles are each associated with geographical locations, such that the server 110 is capable of selecting, retrieving and transmitting one or more tiles in response to receiving a geographical location.

A location may be expressed and requested in various ways including but not limited to latitude/longitude positions, street addresses, street intersections, an x-y coordinate with respect to the edges of a map (such as a pixel position when a user clicks on a map), building names, and other information in other reference systems that is capable of identifying a geographic locations (e.g., lot and block numbers on survey maps). Moreover, a location may define a range of the foregoing.

The system and method may translate locations from one reference system to another. For example, the server 110 may access a geocoder to convert a location identified in accordance with one reference system (e.g., a street address such as "1600 Amphitheatre Parkway, Mountain View, Calif.") into a location identified in accordance with another reference system (e.g., a latitude/longitude coordinate such as (37.423021°, −122.083939)).

In one aspect and as shown in FIG. 3, data 135 defines a set of locations 320 where each location is associated with a street address and a unique identifier ("FID"). Each location 320 may further be associated with a latitude/longitude coordinate, which may represent the actual latitude/longitude position of the street address or an approximation thereof.

The server may also access listing information identifying local businesses or other objects or features associated with particular geographic locations. For example, each listing 310 may be associated with a title (such as a company's name), a category (such as "pizza", "Italian restaurant" or "ballpark") and other information (such as store hours and food on a menu). The information may be compiled by automatically gathering business information such as from websites or telephone directories. The information may also be stored by users; the users may enter or edit the listing information themselves via web pages served by the server 110. Accordingly, the listing information may be obtained from various sources and contain potentially overlapping information, such as one category that is managed by the operator of the server and another category that is obtained from third parties (e.g., yellow pages).

The listing data may also be associated with a geographic location. For example, if the listing refers to a store, the location may identify the store's street address. The listing may refer to a particular location 320 via the location's unique FID identifier.

In many cases, there will be a single listing 310 for each different business. However, it will be understood that the same business may be associated with many different listings, and that a single listing may be associated with many different businesses.

Listings may refer to other geographically-located objects in addition to or instead of businesses. For example, listings may also identify individual's homes, landmarks, roads, bodies of land or water, items located in a store, items that can be moved to different locations etc. Therefore, while many of the examples below refer to business listings, most aspects of the system and method are not limited to any particular type of listing.

The server may also store point of interest ("POI") information identifying parks, iconic buildings or other popular landmarks associated with particular geographic locations. For example, each POI 355 may be associated with a title (such as "The Empire State Building"), a category (such as "building", "ballpark" or "museum") and other information. This data may also be compiled by automatically gathering POI data from websites or telephone directories. If the POI refers to a building, (e.g., the Sears Tower) the location may identify the building's address. The POI may refer to a particular location 320 via the unique FID identifier.

The server may also store a set of advertisements 350. The system and method may select an advertisement based at least in part on whether it is returned in response to a query containing search terms. For example, a company may pay the operator of the server each time the content of the advertisement is displayed or selected by a user in response to the user searching for the keyword "pizza." In that regard, advertisements may be associated with keywords which may be used, along with other criteria, to determine whether the advertisement corresponds with one or more search terms. Search terms are typically text based, but may include other types of data including data representing images and sounds.

In one aspect and as shown in FIG. 1, the advertisements 350 may be directly or indirectly associated with geographic locations. For example, an advertiser may have specifically directed that an advertisement be displayed only when a user is viewing a map or other information associated with a particular geographic area, such as a city or latitude/longitude range. Alternatively, the advertisement may be associated with a listing 310 that is, in turn, associated with a location 320. Other advertisements may not be limited or associated with any particular geographic location.

In addition to the operations illustrated in FIGS. 15-17, various operations in accordance with a variety of aspects of the invention will now be described. It should be understood that the following operations do not have to be performed in the precise order described below. Rather, various steps can be handled in reverse order or simultaneously, and steps may be added or omitted.

In one aspect, the method associates search terms with street addresses based on the listings located at the street address. The system and method may create sets of search terms by iterating over and analyzing each listing at a street address, and using a variety of information as a source for search terms.

Figure 4:
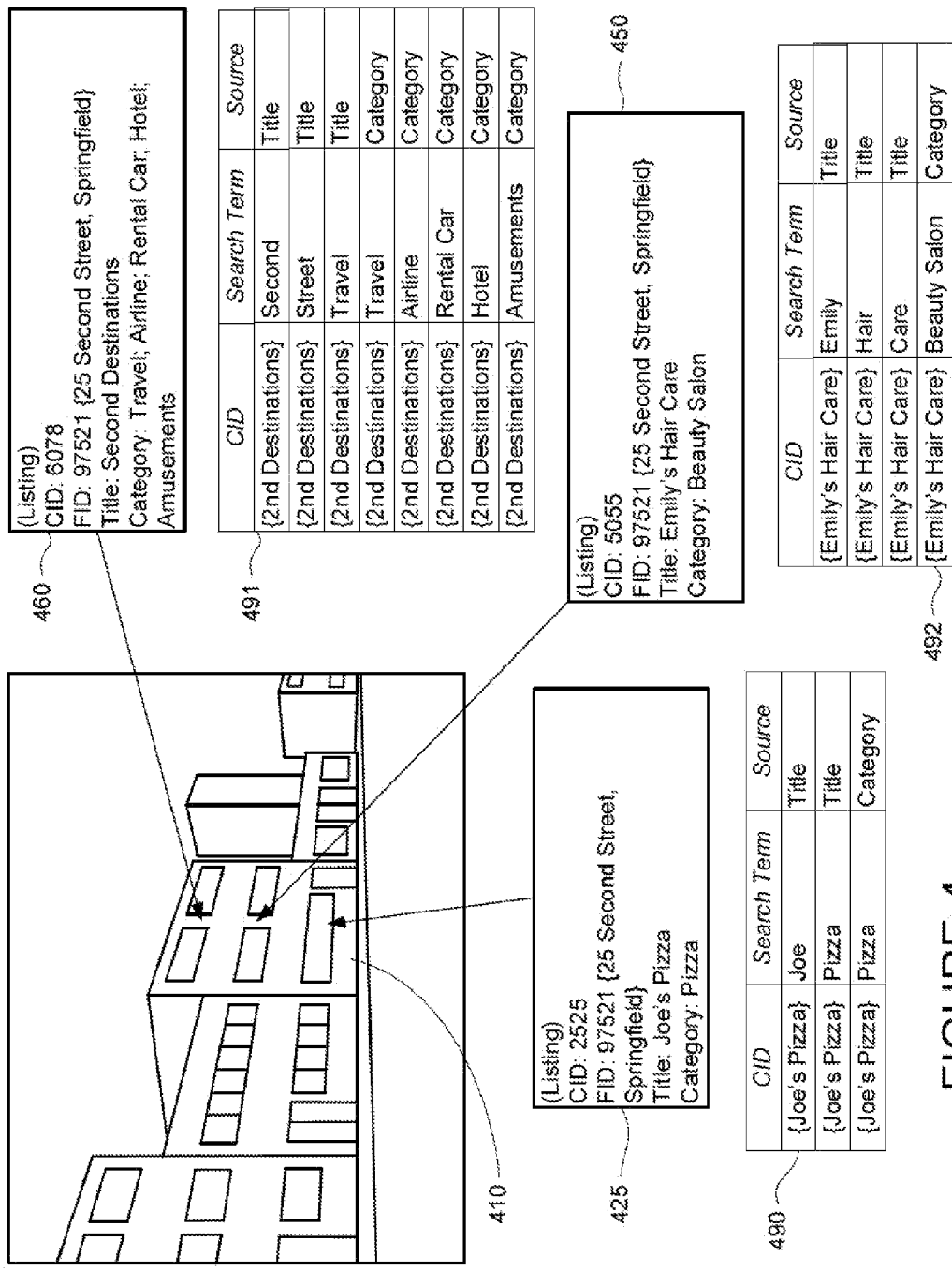
FIG. 4 is a diagram of sample data associated with a street address in accordance with an aspect of the invention.

The names and categories of businesses at the address may be used as address-based search terms. For example, as shown in FIG. 4, there may be three different businesses located in a single building 410 at the fictional address "25 Second Street, Springfield". The first business may be a restaurant on the first floor named "Joe's Pizza" that falls within the category of "pizza." The business may be represented by listing data 425 and assigned a unique ID ("CID") 2525. (For ease of reading, various figures use the listing's title in lieu of the numeric CID.) The system and method may thus create a table 490 of search terms based on listing 425, where the search terms are drawn from the words contained in the listing's title and category.

The system and method may similarly iterate through the listings 450 and 460 at the address, and create tables 491 and 492 accordingly.

The system and method may also select search terms from prior searches that were used to find the listing. The search term may come from prior user queries that resulted in the listing being displayed to, and subsequently selected by, the user. Further still, the search term may be selected from the query that resulted in the listing being selected more times than any other query.

Figure 5:
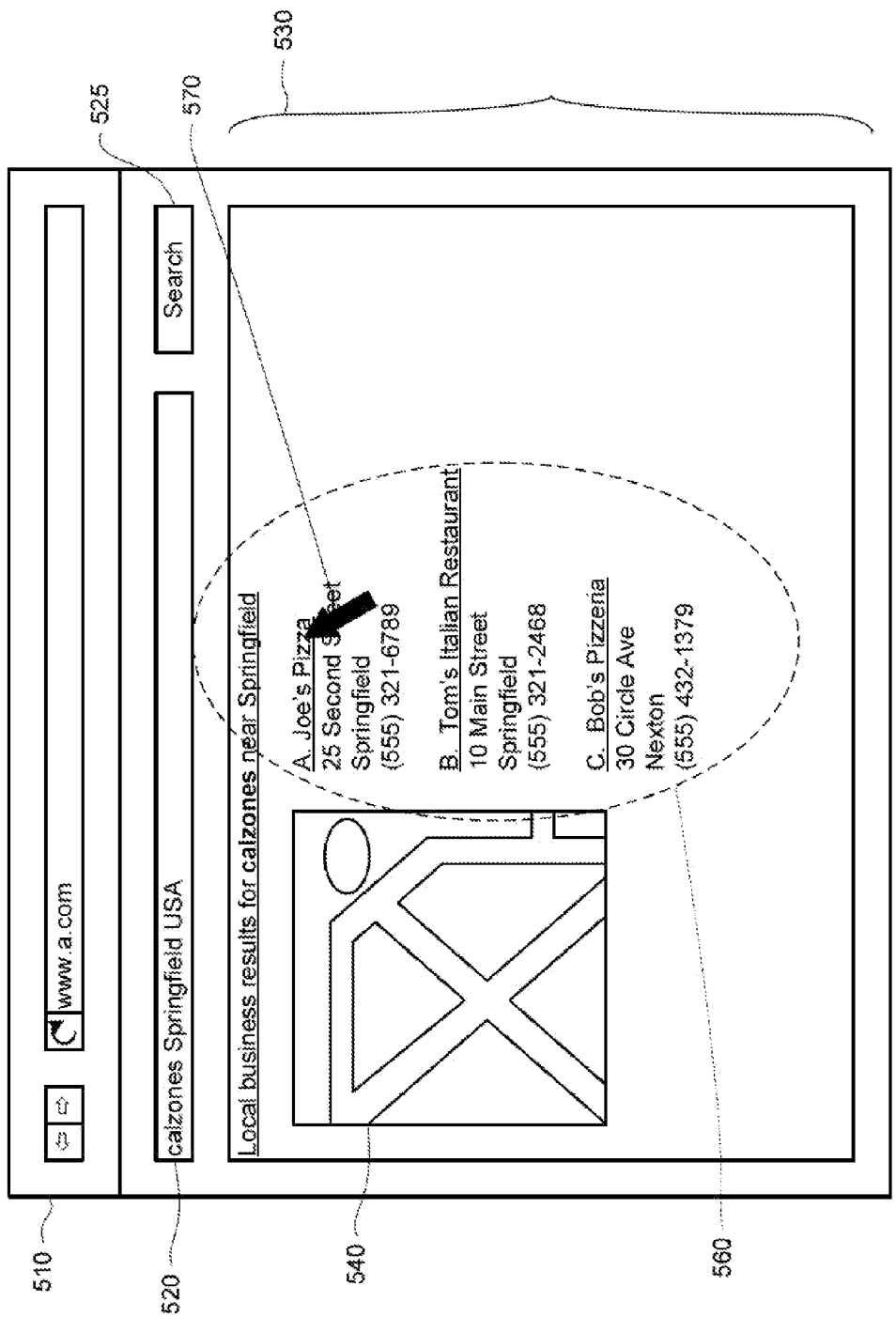
FIG. 5 is a screen shot of a search and search results in accordance with an aspect of the invention.

FIG. 5 illustrates a search that may have been conducted by a user. Specifically, the user entered the query "calzones Springfield" into browser 510 (such as a Google Chrome browser) via text box 520. When the user selected the search button 525, the query was transmitted to the server 110 and passed to the search engine 305. The search engine, in turn, interpreted the query as a request to search for listings associated with the term "calzones" in or near the city of Springfield. Server 110 then returned a webpage 530 of search results for display in the browser. The results included a map 540 of the queried geographic location (Springfield) as well as information 560 from listings that match the search. It will be understood that additional and different types of results may have been returned and displayed in the webpage as well, including by way of example only links to web pages, videos, pictures, sponsored links, advertising and other content.

Figure 6:
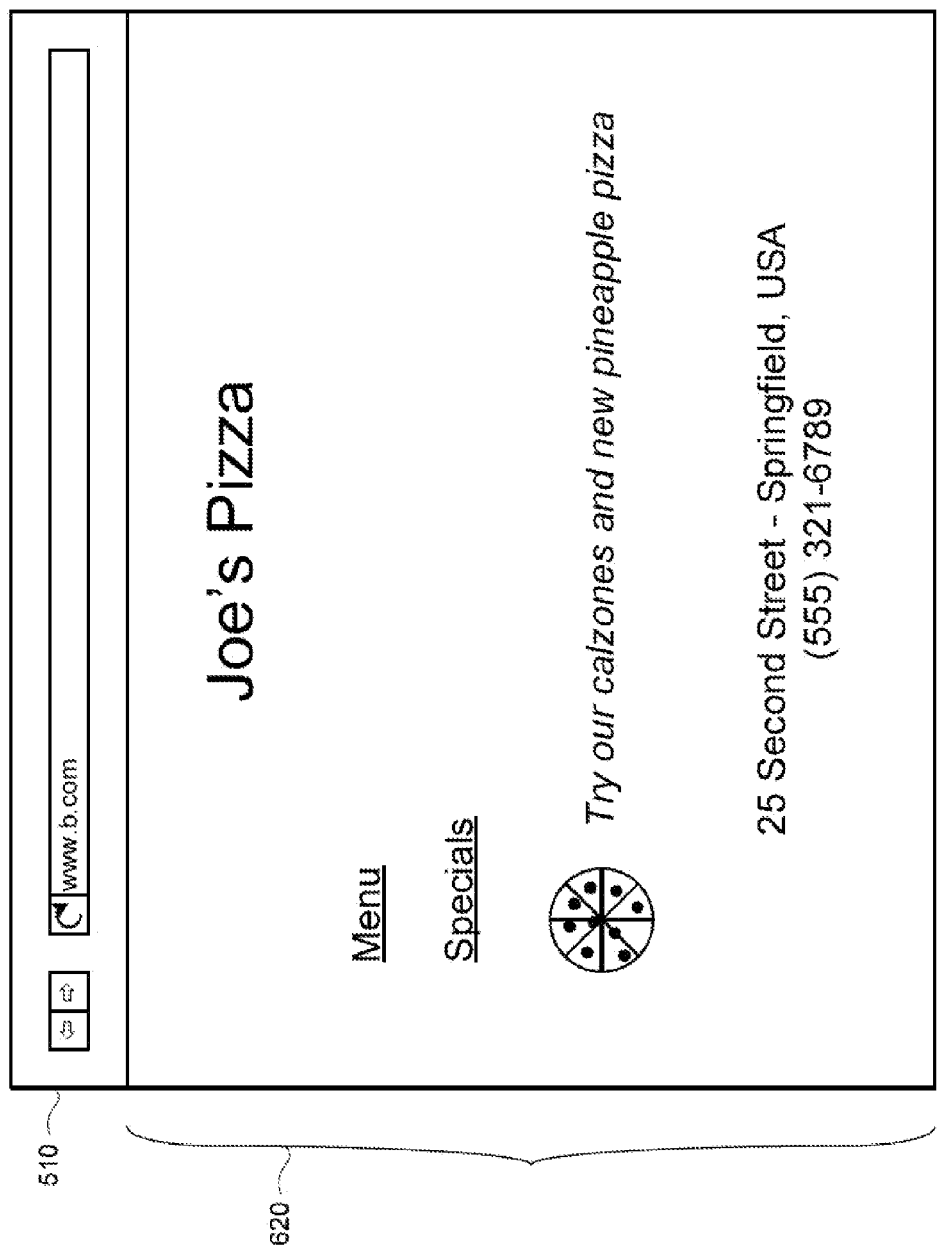
FIG. 6 is a screen shot of a webpage associated with a search result in accordance with an aspect of the invention.

The results of the search may be user selectable. For example, the displayed listing for Joe's Pizza may comprise a hyperlink to the website associated with the business, and the user may use his or her mouse to move cursor 570 to click on the listing. In response and as shown in FIG. 6, the browser 510 may navigate the user to the webpage 620 of the listing. Yet further, the hyperlink may take the user to a webpage served by server by 110 that provides an introduction and summary of the listing. It will be understood that a user may select search result in any number of ways, including using a keyboard to check a checkbox displayed next to the listing.

Each time a user selects one of the listings returned as a search result, the system and method may log the selected result and the query that returned the result. For example, as shown in FIG. 7, server 110 may store an entry in a log 710 each time Joe's Pizza was selected by any user in response to a search request. The log identifies the listing 712, the date and time 714 that the listing was selected, and the query 716 that the user entered when the listing was selected.

In one aspect, the most-popular search term is only selected from queries that include a geographic location and another search term (e.g., the location "Springfield" in the query "calzones Springfield"). In other aspects, the most-popular search term is the most-popular search term regardless of surrounding terms in the query.

It will be understood that the log 710 is not limited to any particular data structure. For example, log 710 illustrated in FIG. 7 may comprise a small portion of a variety of data structures 345 (FIG. 3) that store information associating user queries and the results selected by users in response to those queries.

In one aspect, the system and method determines the most popular search term for the listing. For example, as the system iterates through listings, the system and method may query data 345 based on the identity of the listing and obtain a table such as that shown as log 710. The system and method then iterates through the words of the queries, and counts how many queries contain the word and resulted in the listing being selected. The words are then sorted by count as shown in table 720, where the column "clicks" represents how often the term was associated with the selection of the listing (it being understood that a search result may be selected by a user in ways other than clicking it with a mouse). The term associated with the most "clicks" may then be considered the most popular search term for the listing.

In one aspect of the system and method, the system and method selects a single search term for each listing. FIG. 8 illustrates table 810, which represents all of the candidate search terms for the foregoing example of "Joe's Pizza".

The system and method may select the most popular search term over other search terms if the most-popular search term is considered sufficiently relevant to the listing.

In certain circumstances, the most-popular search may provide advantages over using a listing's categories. For example, a large department store may be associated with dozens of categories. If a user enters a street address matching the store, it may be difficult to assume that the user was looking for a particular category, e.g., "photos", "furniture", or "toys." However, it may also be discovered that the department store was consistently selected when users queried "discount store". Accordingly, it may be more reasonable to infer that another user is searching for discount stores when the user enters that address instead of "photos", "furniture" or similar categories.

Just one method of determining the relevancy of the most popular search term is to determine whether the most successful query for the listing (e.g., "calzones" as shown at reference 811) is associated with a value (e.g., 210 clicks) that exceeds a threshold (e.g., a minimum of 100 clicks).

If the most-popular search term is not sufficiently relevant, the system and method may select one or more of the listing's categories 813. The listing's categories may also be tested for relevancy. For example, a large and prominent department store may be associated with dozens of different categories (e.g., photos, toys and groceries, etc.), none of which are representative of the store. Thus, if the number of categories exceed a threshold (e.g., ten categories), none of the categories may be selected as the listing's search term.

In one aspect, only a single category is selected as the street address. For example, the operator of server 110 may maintain a set of categories and limit each listing to one such category. If the listing is associated with an operator-provided category, the system and method may select the operator-provided category. If the listing is not associated with an operator-provided category but is associated with categories managed by third parties, one of the third-party categories may be selected (e.g., the dominant or first-listed category if there are more than one categories associated with the listing). In yet another aspect, all of the categories associated with a listing may be selected as the search term for the street address.

If the listing's most-popular search term and categories are insufficient, the system and method may determine if the address is associated with a POI by way of the POI database 355. If the address is associated with a POI, the system and method may select the title of the POI record as a search term.

If none of the aforementioned methods yield adequate search terms, one or more of the search terms 811-12 from the title may be selected. For example, the search term for listing 460 (FIG. 4) may be selected from the listing's title, "Second Destinations" because the large number of categories associated with the listing indicates that the categories are too diverse, which makes it difficult to narrow a search to a particular category.

In one aspect of the system and method, a single search term is selected for an address even if there are multiple listings at the address.

One manner in which the single term may be selected includes selecting the search term for the most popular listing. For example, if two listings each have a web site, and if the first web site is extremely popular with many back links and the second website is relatively rarely visited with relatively few back links, the second website may be considered more popular. In that regard, the listing associated with the second web site may be considered more popular and its search terms would be used for selecting advertisements based on the street address.

In another aspect and as shown in FIG. 9, the system and method may compare the search terms selected from each of the different listings (CID column 921) at the same address (FID column 920). For example, if the most-popular search term for one listing resulted in more selections (e.g., resulted in more "clicks") than the most-popular search term for another listing, the first search term may be selected for the entire building. Therefore, as shown in table 910, the term "calzones" may be selected for the address because it resulted in "Joe's Pizza" being selected 210 times. This can be compared to the salon's most-popular search term ("haircut") yielding only 100 selections. It can also be compared to the fact that the travel agency's search term ("destinations") was taken from the agency's title, which the system and method may deem less likely to yield worthwhile results than prior queries. Other criteria may also be used to select the search term for an address when multiple listings are present.

After the system and method selects a search term for one address, the system and method may select additional search terms for additional addresses. FIG. 10 illustrates a table 1010 of different street geographic locations, each of which is associated with a single search term. As shown in FIG. 3, this information 340 may be stored in data 135.

Figure 11:
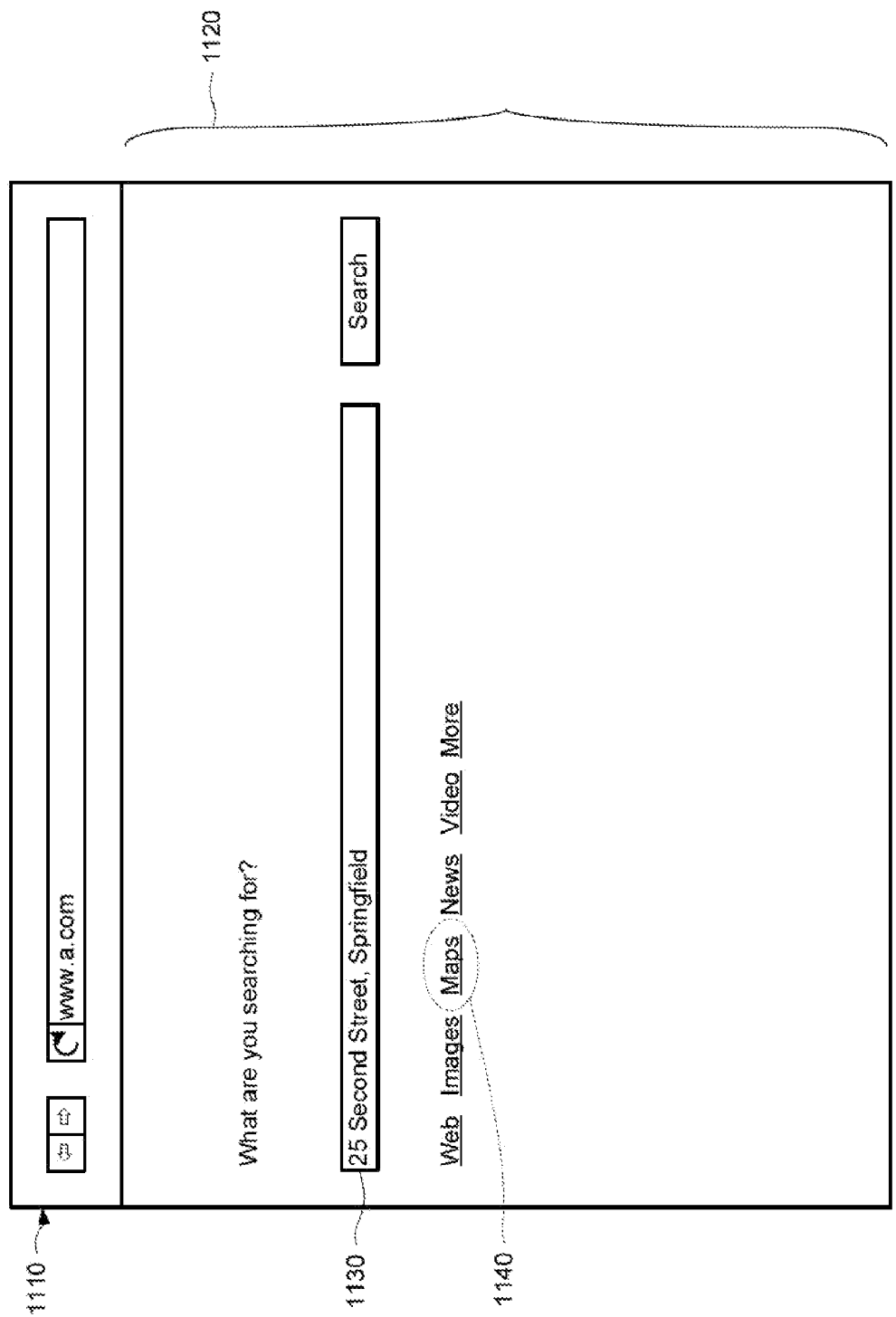
FIG. 11 is a screen shot of a search in accordance with an aspect of the invention.

The address-based search terms may be used to select advertisements for display to users. FIG. 11 illustrates a webpage 1120 served by server 110 to client device 150 and displayed on the electronic display using browser 1110. The search page includes a text box 1130 that allows the user of the client device to enter a search request. FIG. 11 provides the example of a user entering the street address "25 Second Street, Springfield" and no other information.

Upon receiving the search query, the search engine 305 may determine that the user is interested in viewing a map of the requested location. This may occur automatically as a result of the user entering an address, or manually as a result of the user's selection of link 1140 entitled "Maps" after entering the query. Regardless, the server 110 may construct a webpage containing a map of the selected address.

The system and method may also select an advertisement based on the address. For example and as shown in FIG. 3, server 110 may query locations 320 for a street address that exactly, or most closely, matches the user's query. When the street address is found, the server 110 uses the location's FID to query the address-based search terms 340 and retrieve a search term.

The address-based search term, in turn, is used to select an advertisement. The invention is not limited to any particular system and method of selecting advertisements based on search terms. However, for purposes of illustration, one aspect may comprise searching advertisements 350 for all advertisements having keywords that correspond with the selected address-based search term. Matching advertisements are then ranked based on any number of criteria, such as ranking an advertisement depending on whether the keyword is an exact match for the address-based search term, the prominence of the business or website associated with the advertisement, and the price of the advertisement.

Figure 12:
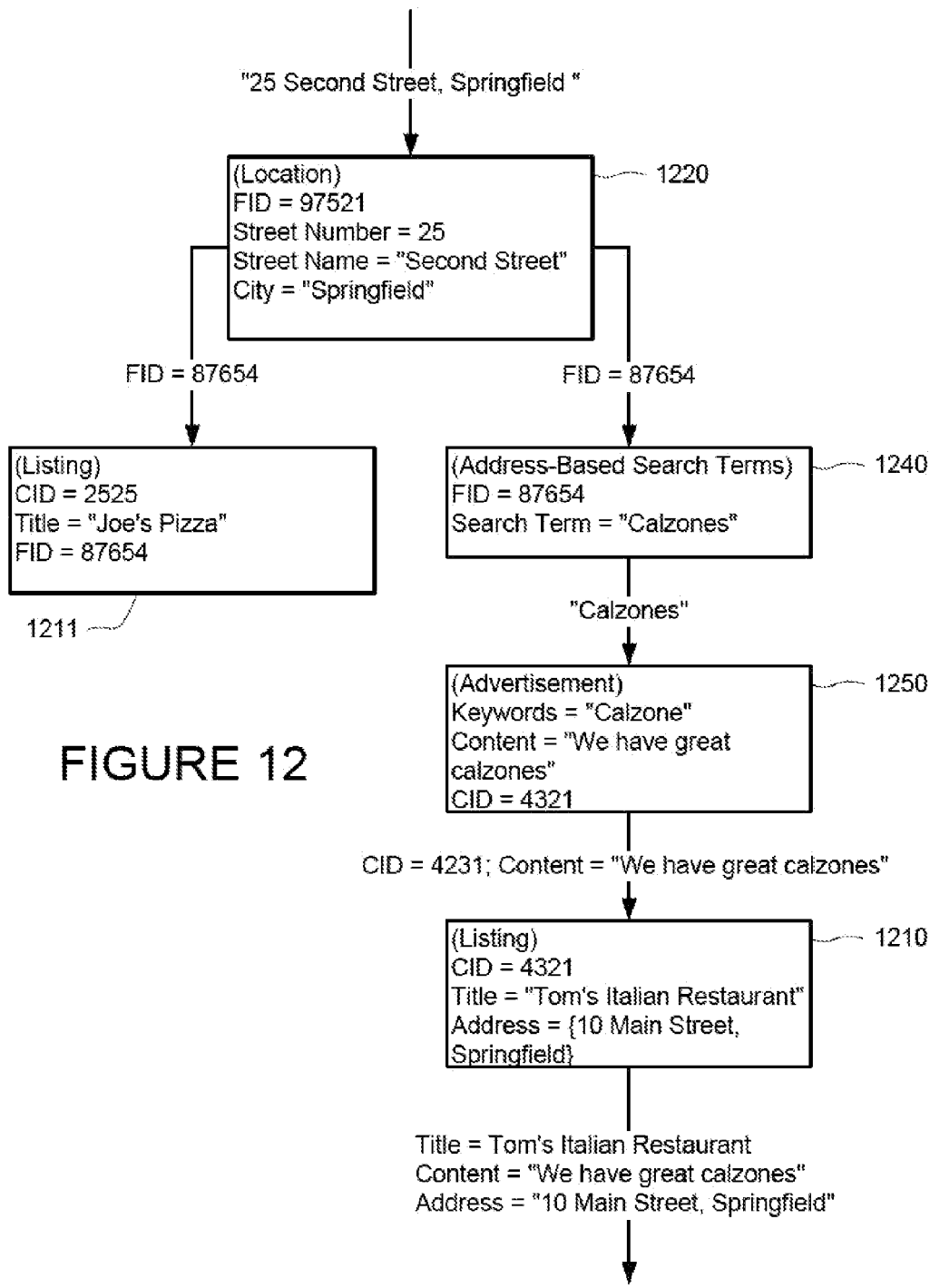
FIG. 12 is a flowchart of the processing of sample data in accordance with an aspect of the invention.

FIG. 12 illustrates how an advertisement may be selected based on the data used in the foregoing examples. The address entered by the user, "25 Second Street, Springfield" is parsed to find a matching location record 1220. The unique identifier (FID=97521) of the matching location is used to retrieve an address-based search term 1240. The search term "calzones" is then used to find an advertisement 1250 that has "calzones" or a variant thereof as a corresponding keyword. If a match is found, the server may retrieve the content ("We have great calzones") and the identification of a listing associated with the advertisement (CID=4321). If there is a listing associated with the advertisement, the identification of the listing may be used to pull additional information about the listing such as its title and address. The server may also retrieve one or more listings 1211 associated with the originally-entered address (e.g., "Joe's Pizza").

Figure 13:
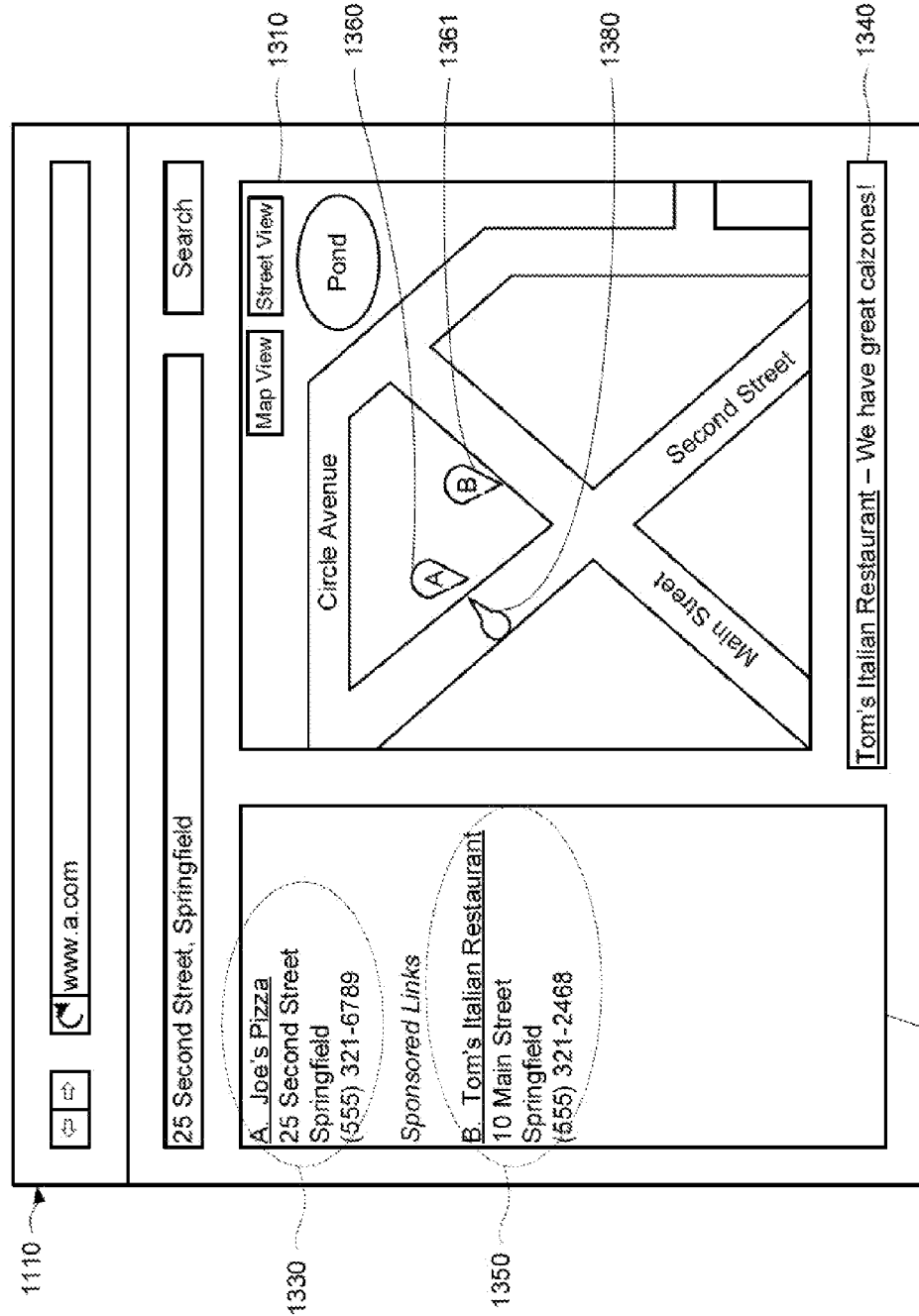
FIG. 13 is a screen shot in accordance with an aspect of the invention.

The advertisement selected with the address-based search term may then be displayed to the user that searched for the street address. FIG. 13 illustrates a screen shot that may be displayed to the user that searched for "25 Second Street, Springfield". The server displays to the user, via browser 1110 on the client device's electronic display, an icon 1380 that identifies the requested address on a map 1310 as well as the text of a listing 1330 at the address (other listings at the address may be displayed as well). The server also displays the advertisement 1340, including in one aspect the name of the advertiser and the content of the advertisement. The server may also display, in the same textbox as the listing at the requested street address, the listing information 1350 of the advertiser as a sponsored link. Icons 1360 and 1361, identifying the location of the listing at the requested address as well as the advertiser, respectively, may also be shown on the map 1310.

In that regard and in one aspect, the system and method may display an advertisement based solely on a street address provided by a user. That advertisement may or may not relate to a business at that address.

Figure 14:
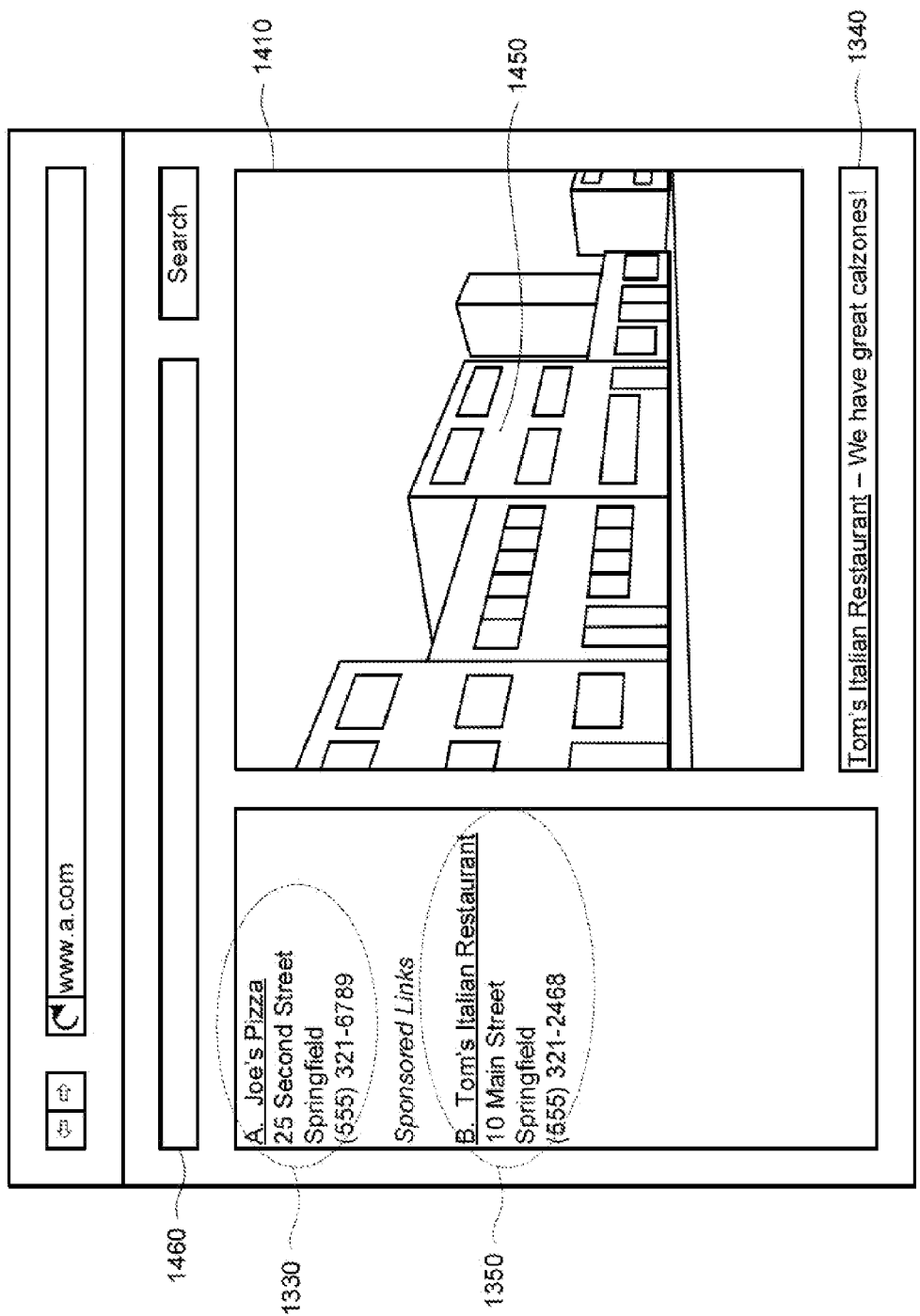
FIG. 14 is a screen shot of a street level image in accordance with an aspect of the invention.

As shown in FIG. 14, the same advertisements 1340 and 1350 may also be shown in connection with a street level image 1410 of the requested location. In one aspect, the user may have entered an address and selected the option of displaying the location in street view.

In another aspect, the user may not have entered a street address but rather navigated to a particular street level image by panning, zooming, etc. In that regard, the user may have navigated to a street level image that displays building 1450 without entering a street address in textbox 1460. If so, the system and method may approximate the street address of the building being viewed based on the latitude/longitude of the street level image and the orientation of the view. The approximated street address may then be used to display advertisements 1340 and 1350.

Accordingly, in at least one aspect, the system and method infers what the user was looking for based on where the user was looking, and selects an advertisement targeted at this inferred intent.

One of the advantages of the invention is its ability to accommodate a wide variety of alternatives.

The system and method may be used in any context where a user enters a street address. For example, in addition to searching for addresses as explained above, the system and method may also be used when a user is searching for directions and enters a destination address.

Moreover, in other aspects of the invention, the system and method may also be used to select advertisements for locations expressed in other reference systems. For example, locations expressed in latitude/longitude may also be used to select listings and search terms for advertisements. Just one process for using latitude/longitude comprises storing latitude/longitude in association with a listing and obtaining keywords from listings within range of the requested latitude/longitude location. Yet another process comprises obtaining latitude/longitude from GPS receiver 189 of client device 170, geocoding the latitude/longitude to obtain a street address, and using the street address as described above to obtain an advertisement and display it on the client device.

The system and method may also be used in connection with continuously-changing locations. For example, if the client device 170 is a cell phone, the client device may consistently display new advertisements as the GPS reviver 189 obtains new location information.

The most-popular search term may be determined based on other criteria than the criteria set forth above. For example, the most-popular search term may also be determined based on frequency rather simply the total amount of times the listing was ever selected in response. In that regard, the various queries may be evaluated based on how often they resulted in the listing's selection within the past day, week, month, etc.

The threshold used to determine sufficient relevancy between the query and the listing may comprise more than a fixed numeric value. For example, fifty clicks over the course of a year may indicate sufficient relevancy between a query and a small business such as a local pizzeria. However, fifty clicks may not be sufficient to determine the relevancy between a search term and a listing that is associated with a website that is viewed by hundreds of people a day. In that regard, the threshold may be a function of the listing's prominence. The threshold may also be calculated based on other parameters. Some of these parameters may be specifically tied to the listing under consideration (such as prominence) and others may be independent (such as minimum value of 50 clicks for all listings).

In another aspect of the system and method, each address may be associated with multiple search terms that are used to query advertisements. For example, if there are multiple listings at an address, a search term from each listing (such as both "calzones" and "beauty salon") may be used to select advertisements. Moreover, rather than selecting only a single search term from each listing, multiple search terms may be selected. For example, all of the search terms shown in table 810 of FIG. 8 or table 910 of FIG. 9 may be used when selecting advertisements for the listing.

When multiple search terms are used to select advertisements, weights may be applied to the terms. The weights may be proportional to the intention of the user. For example, if the address is associated with a POI, the listing's most popular search term may be considered twice as likely as the POI's title to pull an advertisement that will interest a user or that more accurately represents the intention of the user. Therefore, when the advertisement is queried with both terms, the query may indicate that the most-popular search term should be given twice as much weight when selecting and ranking advertisements for display. However, if the weight of the POI's title is greater than or equal to the weight of the most popular search term, the POI's title may be used to select the advertisements for display.

The system and method may also select multiple advertisements based on a single street address. For example, there may be multiple advertisements responsive to the same keyword. In another aspect, different advertisements are selected and displayed based on different search terms from one or many listings. By way of example, a different advertisement may be selected and shown for each search term shown in FIGS. 8 and 9.

The system and method may further assign weights to the location-based search terms and select the number of the advertisements to display based on the weights. The weight may be based on the relative popularity of the most-popular search terms at the requested location. In view of the data shown in FIG. 9, two advertisements may be selected based on "calzones" and one advertisement may be selected based on "haircut" because the listings at the street address received 100 clicks for "haircut" and 210 clicks for "calzones". Alternatively, the weight may be based on other factors, including information that is neither specific to the requested location nor the location's associated listings. For example, a statistical analysis of all-available evidence may indicate that user's are generally twice as likely to choose advertisements that are selected with the term "haircut" than "calzones." As a result, the system and method may display twice as many advertisements based on "calzones" than "haircut" in spite of the popularity of the search terms relative to the listings of 25 Second Street. Weights based on combinations of the above are also possible.

As noted above, listings are not limited to businesses. In that regard, the system and method may also be used in connection with points of interest (POI). For example, the street address of the Empire State Building in New York City is "350 5th Ave, New York, N.Y. 10018". There may be over one hundred businesses associated with the tenants at that address. In that regard, rather than selecting one of the tenants of the building as the search term for the address, the system and method may use the name of building as the source of the advertisement search term. Thus, one aspect of the system and method may determine whether the street address is associated with a landmark or similar POI listing, and accord more weight to the POI listing than business listings when selecting advertisement search terms.

Figure 15:
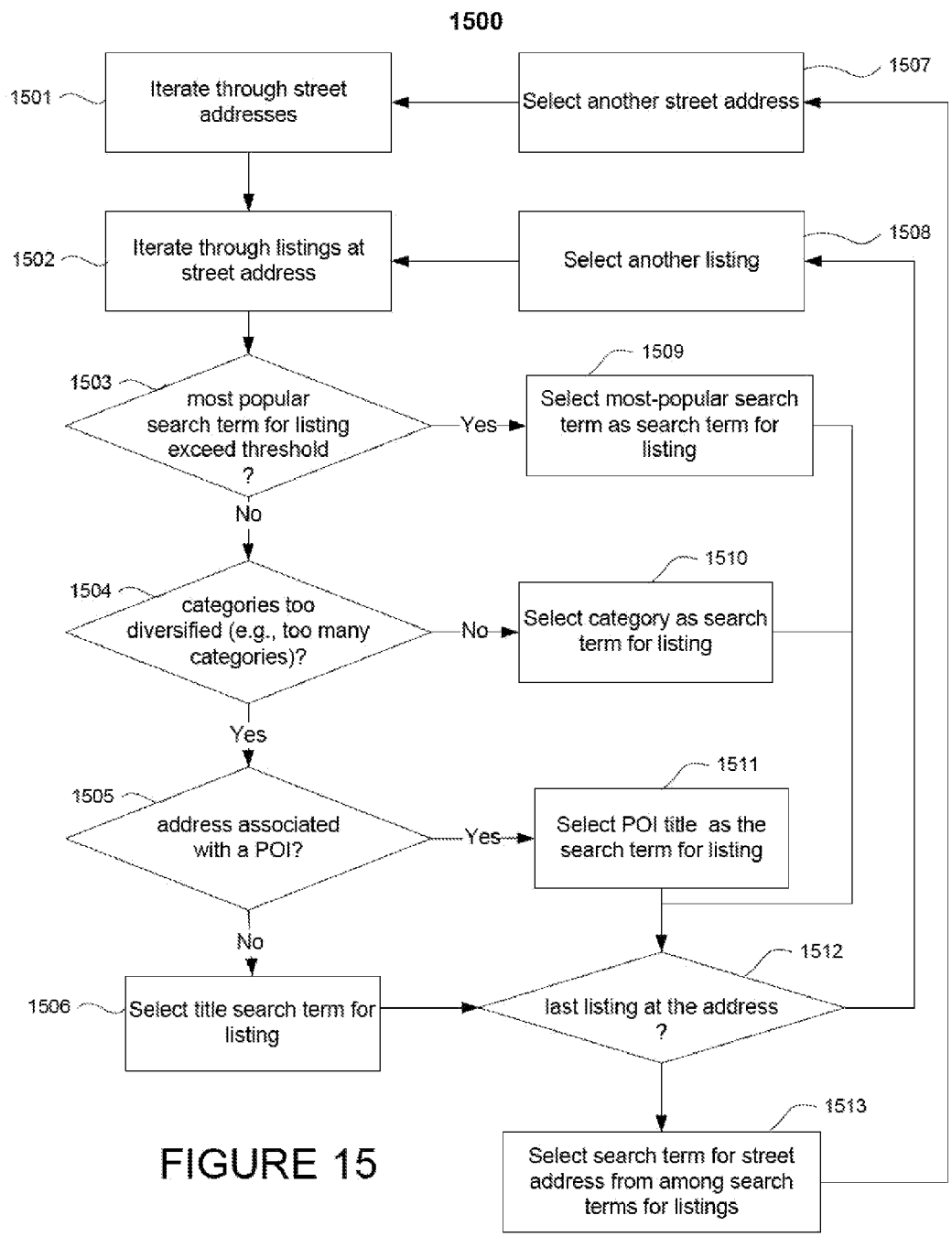
FIG. 15 is another flowchart in accordance with an aspect of the invention.

FIG. 15 is an exemplary method 1500 for selecting a search term in accordance with one aspect of the invention. In the exemplary process of FIG. 15, the system and method iterates through different street addresses in block 1501 and different business listings in block 1502. These iterations may be triggered upon receipt of a user's query indicating a location. In block 1503 the system and method may determine whether the most popular search term for a listing can be determined. The most popular search term may be determined as described above. If the most popular search term may be determined in block 1503 the system and method may advance to step 1509 and select the most popular search term for the listing. If the most popular search term cannot be determined in block 1503, the system and method may advance to step 1504 and check if the categories are too diverse. This may occur if a user queries a densely populated area (e.g., midtown Manhattan). If the category is not too diverse, the system and method may advance to block 1510 and select the category as the search term. For example, if a user queries "pizza midtown Manhattan" the category of "pizza" may be used to search through the listings in midtown Manhattan.

If the category is too diverse, the system and method may advance to step 1505 and determine if this address is associated with a POI. This may be determined via the POI database 346. If the address is associated with a POI, then the system and method may advance to step 1511 and select the POI's title as the search term for the listing.

If the address is not associated with a POI, the system and method may advance to block 1506 and select the title as the search term for the listing. In block 1512, the system and method determines if the current listing is the last listing at the address. If the current listing is not the last listing at the address, the system and method may advance to block 1508 to select another listing. The selection of the next listing will be based on the search term determined in the aforementioned steps. If the current listing is the last listing at the address, the system and method may advance to step 1513 and select a search term for a street address from among the selected search terms from the listings. The system and method may then return to block 1507 to select another street address.

It is understood that the metrics disclosed, namely the diversity metric and the most popular search term metric, are illustrative and that many different search term metrics may be utilized.

Figure 16:
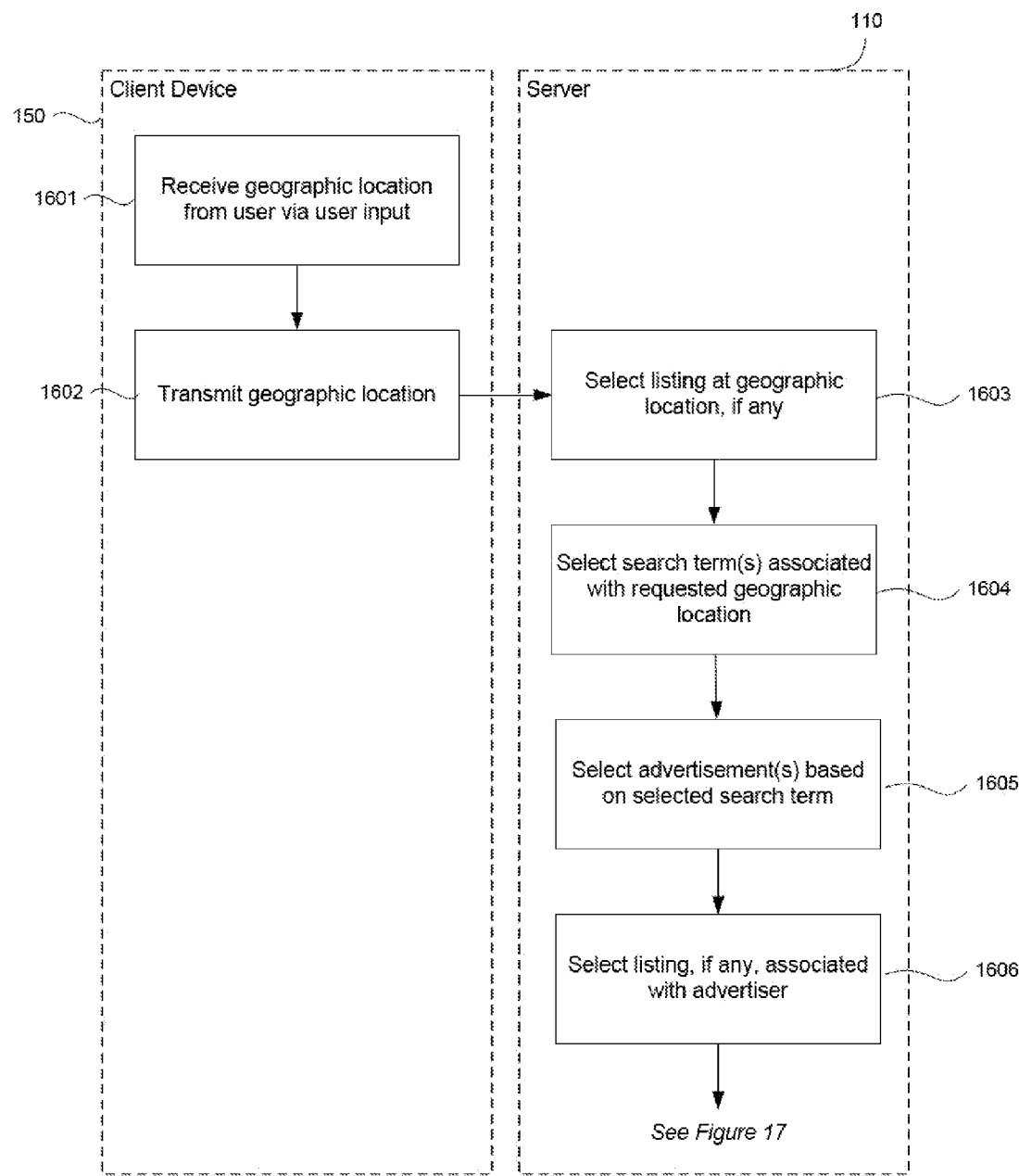
FIG. 16 is a further flowchart in accordance with an aspect of the invention.
Figure 17:
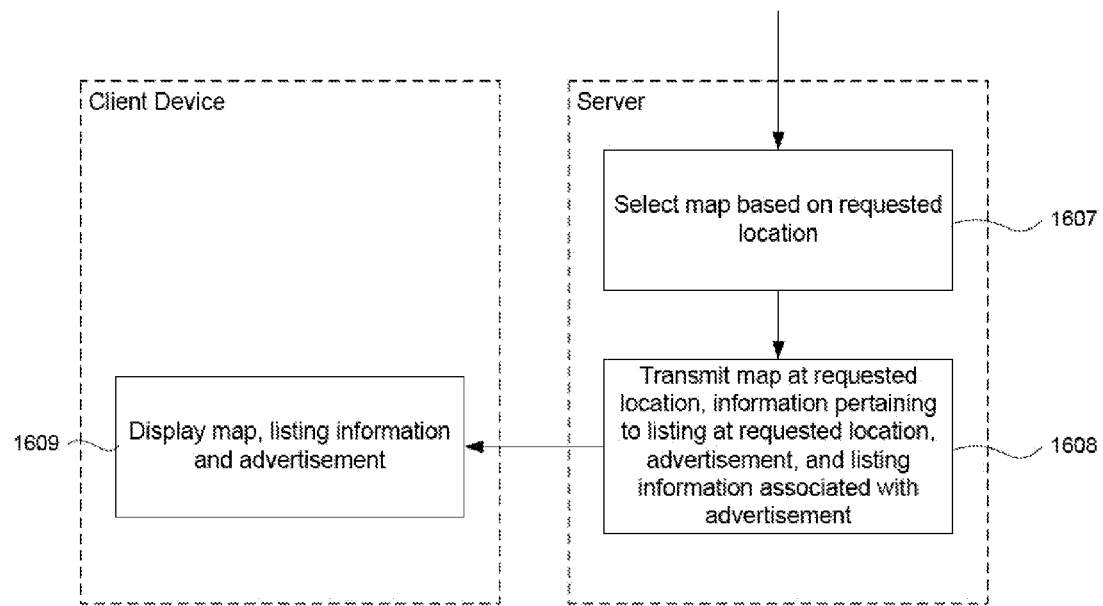
FIG. 17 is yet a further flowchart in accordance with an aspect of the invention.

FIG. 16-17 illustrate an exemplary method for displaying information to a user using a client device. In block 1601, processor 154 of client device 150 receives a geographic location from a user via user input. In block 1602, processor 154 may transmit the request to the server 110. In block 1603, processor 120 of the server 110 may select a listing at a geographic location. This may be done via listings database 310 and location database 320 illustrated in FIG. 3. In block 1604, processor 120 may select search term(s) associated with the requested location. The search terms may be selected using the exemplary method of FIG. 15. Once the search terms are selected, processor 120 may advance to block 1605 and select advertisements based on the selected search terms. The processor 120 may accomplish this by utilizing the advertisement database 350 illustrated in FIG.

3. In block 1606, the processor 120 may select a listing associated with the advertiser, if any.

Referring now to FIG. 17, in block 1607, the processor 120 may select map data based on the location requested by the user. Next, in block 1608, processor 120 may transmit, to the client 150, the map data and all other data pertaining to the requested location (e.g., advertisements, business listing information, etc.). In block 1609, processor 154 of client device 150 may display the map data, listing information and advertisement information.

In other aspects, functions described above as being performed by the server may be performed by the client device, and vice versa. For example, the server may send listing information at the requested address to the client device, and the client device may use the listing information to determine a search term and request more information. In yet more aspects, the client device and server perform and share different functions.

Instead of advertisements, the system and method may also be used to select descriptions of products, services and other information. For example, if some of the search terms were music related, the system and method may provide a description of local bands, local music venues or location-neutral music information such as song titles.

It will be understood that references herein to "search term" may include search terms that include more than one word, i.e., a search term may comprise multiple words. It will be similarly understood that when a search query "contains" a search term (e.g. "pizza"), the query may only that one term or multiple terms (e.g., "pizza in Springfield").

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A method of selecting an advertisement associated with a geographic location, comprising:
receiving, using one or more processors, a request from a remote computer, the request identifying the geographic location from location signals associated with the remote computer, the location signals determined at the remote computer using an antenna for receiving location signals and associated software for determining the position of the remote computer based on the received location signals;
determining, using the one or more processors, a listing associated with the geographic location and the request;
determining, using the one or more processors, a number of previous users that selected the listing associated with the geographic location in response to the previous users providing a first search term;
when the number of previous users exceeds a predetermined threshold, selecting, using the one or more processors, the first search term as one or more search terms associated with the geographic location;
when the number of previous users does not exceed the predetermined threshold, determining, using the one or more processors, a number of listing categories associated with the geographic location;
when the number of listing categories falls below a given threshold, selecting, using the one or more processors, the listing categories as the one or more search terms associated with the geographic location;
when the number of listing categories does not fall below the given threshold, determining, using the one or more processors and without user input, a point of interest that is associated with the geographic location and selecting a title of the point of interest as the one or more search terms associated with the geographic location;
determining, using the one or more processors, an advertisement based at least in part on the one or more search terms associated with the geographic location; and
transmitting, using the one or more processors, the advertisement to an electronic display of the remote computer for display to the user in response to the request.

2. The method of claim 1, wherein a unique identifier associates the point of interest with the geographic location.

3. The method of claim 1, wherein the advertisement is at least one business listing associated with the point of interest.

4. The method of claim 1, wherein the antenna for receiving location signals at the remote computer comprises one or more of an antenna associated with a GPS receiver or a cell phone antenna.

5. The method of claim 1, wherein the geographic location comprises a street address.

6. The method of claim 5, wherein the listing pertains to a business that is located at the geographic location.

7. The method of claim 1, further comprising:
setting, using the one or more processors, the first search term equal to the title of the point of interest;
generating, using the one or more processors, the second search term associated with the geographic location based at least in part on the at least one metric;
determining, using the one or more processors, the first weight associated with the first search term, the first weight being proportional to the first probability that the first search term will result in information that coincides with the intention of the user sending the request; and
determining, using the one or more processors, the second weight associated with the second search term, the second weight being proportional to the second probability that the second search term will result in information that coincides with the intention of the user sending the request.

8. A system, comprising:
one or more processors; and
a first memory including instructions that, when executed by the one or more processors, cause the one or more processors to:
receive a request from a remote computer, the request identifying a geographic location from location signals associated with the remote computer, the location signals determined at the remote computer using an antenna for receiving location signals and associated software for determining the position of the remote computer based on the received location signals;
determine a listing associated with the geographic location and the request;

determine a number of previous users that selected the listing associated with the geographic location in response to the previous users providing a first search term;

when the number of previous users exceeds a predetermined threshold, select the first search term as one or more search terms associated with the geographic location;

when the number of previous users does not exceed the predetermined threshold, determine a number of listing categories associated with the geographic location;

when the number of listing categories falls below a given threshold, select the listing categories as the one or more search terms associated with the geographic location;

when the number of listing categories does not fall below the given threshold, determine a point of interest associated with the geographic location and select a title of the point of interest as the one or more search terms associated with the geographic location;

select an advertisement that matches a query that comprises the one or more search terms associated with the geographic location; and transmit the advertisement to an electronic display of the remote computer for display to the user in response to the request.

9. The system of claim 8, further comprising:
a second memory for storing street addresses;
a third memory for storing listing information for businesses, where each business is associated with a member of the street addresses;
a fourth memory for storing a set of advertisements, where each advertisement is associated with a keyword; and
a fifth memory for storing a set of point of interest data associated with the member of the street addresses and the listing information,
wherein the one or more processors are coupled to the second memory, the third memory, the fourth memory, and the fifth memory.

10. The system of claim 9, wherein the instructions, when executed by the one or more processors, further cause the one or more processors to:
determine whether the geographic location is associated with the point of interest when a search term associated with the geographic location cannot be generated based on at least one metric.

11. The system of claim 10, wherein the instructions, when executed by the one or more processors, further cause the one or more processors to:
determine whether the search term associated with the geographic location can be generated based on the at least one metric; and if the search term associated with the geographic location can be generated based on the at least one metric, select the advertisement based at least in part on the search term.

12. The system of claim 11, wherein the one or more processors are configured to select the advertisement from the set of advertisements and select at least one listing from the listing information for the businesses.

13. The system of claim 12, wherein the at least one advertisement and the at least one listing pertain to the point of interest and the request is exclusive of the name of the point of interest.

14. A non-transitory machine readable medium embodying instructions that, when executed by a machine, cause the machine to perform a method for selecting an advertisement associated with a geographic location, the method comprising:

receiving a request from a remote computer, the request identifying the geographic location from location signals determined at the remote computer using an antenna for receiving location signals and associated software for determining a geographic position of the remote computer based on the received location signals;

determining a business listing associated with the geographic location and the request;

determining a number of previous users that selected the business listing associated with the geographic location in response to the previous users providing a first search term;

when the number of previous users exceeds a predetermined threshold, selecting the first search term as one or more search terms associated with the geographic location;

when the number of previous users does not exceed the predetermined threshold, determining a number of listing categories associated with the geographic location;

when the number of listing categories falls below a given threshold, selecting the listing categories as the one or more search terms associated with the geographic location;

when the number of listing categories does not fall below the given threshold, determining a point of interest that is associated with the geographic location and selecting a title of the point of interest as the one or more search terms associated with the geographic location;

determining an advertisement based at least in part on the one or more search terms associated with the geographic location; and transmitting the advertisement to an electronic display of the remote computer for display to the user in response to the request.

* * * * *